United States Patent
Nagase

(10) Patent No.: US 10,723,865 B2
(45) Date of Patent: Jul. 28, 2020

(54) TIRE

(71) Applicant: SUMITOMO RUBBER INDUSTRIES, LTD., Kobe-shi, Hyogo (JP)

(72) Inventor: Takayuki Nagase, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 71 days.

(21) Appl. No.: 15/657,840

(22) Filed: Jul. 24, 2017

(65) Prior Publication Data

US 2018/0057669 A1 Mar. 1, 2018

(30) Foreign Application Priority Data

Aug. 23, 2016 (JP) .................. 2016-162829

(51) Int. Cl.
| | |
|---|---|
| *C08L 9/06* | (2006.01) |
| *C08K 5/00* | (2006.01) |
| *B60C 1/00* | (2006.01) |
| *C08L 21/00* | (2006.01) |
| *C08L 65/00* | (2006.01) |
| *C08L 33/04* | (2006.01) |

(52) U.S. Cl.
CPC .............. *C08L 9/06* (2013.01); *B60C 1/0016* (2013.01); *C08K 5/0016* (2013.01); *C08L 21/00* (2013.01); *C08L 65/00* (2013.01); *C08L 33/04* (2013.01); *C08L 2205/025* (2013.01); *C08L 2205/035* (2013.01); *C08L 2207/322* (2013.01); *C08L 2207/324* (2013.01)

(58) Field of Classification Search
CPC ................ C08L 9/06; C08L 2205/035; C08L 2205/025; C08L 2207/324; C08L 2207/322; C08L 21/00; C08L 65/00; C08L 33/04; C08L 2201/08; C08K 5/0016; C08K 2003/2296; B60C 1/0016
See application file for complete search history.

(56) References Cited

U.S. PATENT DOCUMENTS

| | | | | |
|---|---|---|---|---|
| 5,385,989 A | * | 1/1995 | Ohya | C08G 8/28 525/423 |
| 2002/0169245 A1 | * | 11/2002 | Ohta | B60C 1/0016 524/443 |
| 2012/0302665 A1 | * | 11/2012 | Wang | B60C 1/0016 523/157 |
| 2015/0191047 A1 | * | 7/2015 | Kojima | C08K 5/0016 152/209.5 |

FOREIGN PATENT DOCUMENTS

| | | | | |
|---|---|---|---|---|
| JP | 2003420274 | * | 7/2005 | ............... C08G 8/00 |
| JP | 2012-162620 A | | 8/2012 | |

OTHER PUBLICATIONS

Derwent Abstract of JP 2003-420274, pp. 1-4 (2005).*
Fudow—Xylene Resin NIKANOL, pp. 1-4, Aug. 12, 2012.*

* cited by examiner

*Primary Examiner* — Alexander C Kollias
(74) *Attorney, Agent, or Firm* — Birch, Stewart, Kolasch & Birch, LLP

(57) ABSTRACT

The object of the present invention is to provide a tire which is excellent in steering stabilities at low temperature and at high temperature after aging without deterioration of the initial steering stabilities at low temperature and at high temperature. The present invention relates to a tire having a tread composed of a rubber composition comprising a softener comprising 5 to 50 parts by mass of an adhesive resin and 5 to 50 parts by mass of a xylene-based low-temperature plasticizer based on 100 parts by mass of a rubber component.

14 Claims, No Drawings

TIRE

TECHNICAL FIELD

The present invention relates to a tire having a tread composed of a specified rubber composition.

BACKGROUND OF THE INVENTION

Tire tread is expected to maintain excellent steering stability (steering stability performance) in a wide range of air temperature and in a wide range of road surface temperature. In other words, tire tread is expected to maintain stable steering stability (excellent steering stability in terms of temperature dependence) not only on a low-temperature road surface in winter but also on a high-temperature road surface in summer.

Conventionally, in order to improve steering stability on a high-temperature road surface a method in which a liquid polymer, in addition to an oil, is blended as a softener to a rubber composition for tread or a method in which a resin is blended has been attempted. On the other hand, in order to improve steering stability on a low-temperature road surface a method in which a low-temperature softener is blended has been studied.

However, there is a problem that the content of the low-temperature softener which is blended for the purpose of improving performance on a low-temperature road surface is, compared to oil, more likely to be reduced by transferring to neighboring members and by volatilization, and as a result, the rubber becomes hardened and steering stability tends to deteriorate.

Although JP 2012-162620 A describes a rubber composition for tread which contains a certain resin and softener, temperature dependence of steering stability has not been considered.

SUMMARY OF THE INVENTION

The object of the present invention is to provide a tire which is excellent in steering stabilities at low temperature and at high temperature after aging without deterioration of the initial steering stabilities at low temperature and at high temperature.

The present invention relates to a tire having a tread composed of a rubber composition comprising:

a softener comprising 5 to 50 parts by mass of an adhesive resin and 5 to 50 parts by mass of a xylene-based low-temperature plasticizer based on 100 parts by mass of a rubber component.

It is preferable that a content of the adhesive resin in the softener is not more than 70% by mass.

A content ratio of the adhesive resin to a xylene-based low-temperature plasticizer (adhesive resin/xylene-based low-temperature plasticizer) is preferably 0.5 to 5.0.

A softening point of the adhesive resin is preferably 50° C. to 170° C.

The adhesive resin is preferably a resin having a phenolic, coumarone-indene, terpene, acrylic, or styrene structure.

It is preferable that a viscosity at 75° C. of the xylene-based low-temperature plasticizer is 5,000 mPa/s or lower and a hydroxyl value thereof is 10 to 50 mg KOH/g.

The tire of the present invention having a tread composed of a rubber composition comprising a softener comprising 5 to 50 parts by mass of an adhesive resin and 5 to 50 parts by mass of a xylene-based low-temperature plasticizer based on 100 parts by mass of a rubber component is a tire which is excellent in steering stabilities at low temperature and at high temperature after aging without deterioration of the initial steering stabilities at low temperature and at high temperature.

DETAILED DESCRIPTION

A tire of an embodiment of the present invention has a tread composed of a rubber composition comprising a softener comprising 5 to 50 parts by mass of an adhesive resin and 5 to 50 parts by mass of a xylene-based low-temperature plasticizer based on 100 parts by mass of a rubber component.

Steering stabilities at low temperature and at high temperature after aging can be improved without extra burdens during a manufacturing process by blending specified amounts of an adhesive resin and a xylene-based low-temperature plasticizer.

Examples of the adhesive resins include ones commonly used in rubber compositions for conventional tires, such as aromatic petroleum resins. Examples of the aromatic petroleum resins include phenolic resins having a phenolic structure, coumarone-indene resins having a coumarone-indene structure, terpene resins having a terpene structure, styrene resins having a styrene structure, acrylic resins having an acrylic structure, rosin resins, and dicyclopentadiene resins (DCPD resins) and the like. Examples of the phenolic resins include Koresin (manufactured by BASF) and Tackirol (manufactured by Taoka Chemical Co., Ltd.) and the like. Examples of the coumarone-indene resins include Esukuron (manufactured by Nippon Steel Chemical Co., Ltd.), Neopolymer (manufactured by Nippon Petrochemicals Co., Ltd.) and the like. Examples of the styrene resins include SYLVATRAXX 4401 (manufactured by Arizona Chemical Corporation) and the like. Examples of the terpene resins include TR7125 (manufactured by Arizona Chemical Corporation), TO125 (manufactured by Yasuhara Chemical Co., LTD.) and the like.

A softening point of the adhesive resin is preferably 50° C. or higher, more preferably 60° C. or higher. Also, the softening point of the adhesive resin is preferably 170° C. or lower, more preferably 160° C. or lower.

These adhesive resins may be used individually or in combination; however, it is more preferable that a low softening point adhesive resin and a high softening point adhesive resin are used together. By blending adhesive resins which have different softening points, steering stability can be improved in a wider range of temperature.

A softening point of the low softening point adhesive resin is preferably 50° C. or higher, more preferably 60° C. or higher. Also, the softening point of the low softening point adhesive resin is preferably 110° C. or lower, more preferably 100° C. or lower. The low softening point adhesive resin is not specifically limited as long as its softening point is within the above range.

A softening point of the high softening point adhesive resin is preferably higher than 110° C., more preferably 120° C. or higher. Also, the softening point of the high softening point adhesive resin is, taking dispersibility into consideration, preferably 170° C. or lower, more preferably 160° C. or lower. The high softening point adhesive resin is not specifically limited as long as its softening point is within the above range.

A content of the adhesive resin based on 100 parts by mass of the rubber component is 5 parts by mass or more, preferably 10 parts by mass or more, more preferably 20 parts by mass or more. Also, the content of the adhesive resin is 50 parts by mass or less, preferably 40 parts by mass or less, more preferably 30 parts by mass or less. When the content of the adhesive resin is more than 50 parts by mass, dispersibility of the adhesive resin is insufficient and thus breaking resistance may deteriorate.

Also, when the xylene-based low-temperature plasticizer is comprised, deterioration of steering stability at low temperature due to the addition of the adhesive resin can be ameliorated and steering stability in a wide temperature range can be improved to a higher grade. Especially, it is thought that the xylene-based low-temperature plasticizer can enhance compatibility with diene rubbers, whereby changes caused by aging are reduced. The xylene-based low-temperature plasticizer may be used individually or in combination.

A viscosity of the xylene-based low-temperature plasticizer is not specifically limited, but, taking steering stability at low temperature into consideration, at 75° C., is preferably 5,000 mPa·s or lower, more preferably 2,000 mPa·s or lower. It should be noted that the lower limit of the viscosity is not specifically limited.

A hydroxyl value of the xylene-based low-temperature plasticizer is not specifically limited, but, taking adhesive grip performance into consideration, is preferably 10 mg KOH/g or higher, more preferably 15 mg KOH/g or higher. Also, taking compatibility with the rubber component into consideration, the hydroxyl value is preferably 50 mg KOH/g or lower, more preferably 40 mg KOH/g or lower.

A content of the xylene-based low-temperature plasticizer based on 100 parts by mass of the rubber component is 5 parts by mass or more, preferably 10 parts by mass or more, more preferably 15 parts by mass or more. When the content is less than 5 parts by mass, sufficient plasticity at low temperature may not be obtained. Also, the content of the xylene-based low-temperature plasticizer is 50 parts by mass or less, preferably 40 parts by mass or less, more preferably 30 parts by less. When the content of the xylene-based low-temperature plasticizer is more than 50 parts by mass, breaking resistance may considerably deteriorate.

The content ratio of the adhesive resin to the xylene-based low-temperature plasticizer (adhesive resin/xylene-based low-temperature plasticizer) is, taking steering stability at high temperature into consideration, preferably 0.5 or more, more preferably 1.0 or more. Also, the content of the adhesive resin to the xylene-based low-temperature plasticizer is, taking steering stability at high temperature into consideration, preferably 5.0 or less, more preferably 4.0 or less.

Examples of the rubber component include isoprene-based rubbers such as natural rubber (NR), isoprene rubber (IR), diene rubbers such as butadiene rubber (BR), styrene-butadiene rubber (SBR), styrene-isoprene-butadiene rubber (SIBR), ethylene propylene diene rubber (EPDM), chloroprene rubber (CR), acrylonitrile butadiene rubber (NBR), butyl rubber (IIR) and the like. The rubber component may be used alone or two kinds or more may be used together. Among those, NR, IR, BR, SBR are preferable and SBR and BR are more preferable because steering stability and abrasion resistance can be improved in a good balance.

The SBR is not specifically limited, and, for example, an emulsion polymerized styrene-butadiene rubber (E-SBR), a solution polymerized styrene-butadiene rubber (S-SBR), and the like can be used.

A styrene content of the SBR is, taking steering stability into consideration, preferably 20% by mass or more, more preferably 25% by mass or more. Also, the above styrene content is, taking abrasion resistance and steering stability into consideration, preferably 60% by mass or less, more preferably 50% by mass or less. It should be noted that in the present invention the styrene content of the SBR is calculated by H1-NMR measurement.

When the SBR is comprised, the content of the SBR based on 100% by mass of the rubber component is, taking heat resistance, steering stability, and abrasion resistance into consideration, preferably 10% by mass or more, more preferably 15% by mass or more, further preferably 60% by mass or more. Also, the upper limit of the content of the SBR is not specifically limited and may be 100% by mass.

The rubber composition according to the present embodiment may suitably comprise, other than the above components, compounding agents used for production of rubber composition in general, for example, such as a softener other than the above adhesive resin and xylene-based low-temperature plasticizer, reinforcing filler(s), a coupling agent, a zinc oxide, a stearic acid, a palmitic acid, a lauric acid, a fatty acid zinc soap, an anti-aging agent, wax, a vulcanizing agent, vulcanization accelerators and the like.

It is preferable for the rubber composition to comprise a softener other than the above adhesive resin and xylene-based low-temperature plasticizer because that can further improve not only initial steering stability but also steering stability after aging. Examples of the softeners other than the adhesive resin and the xylene-based low-temperature plasticizer are not specifically limited, but include oil, liquid diene polymer, and others.

Examples of the oil include process oils such as paraffinic oils, aromatic oils, and naphthenic oils.

When the oil is blended, a content of the oil based on 100 parts by mass of the rubber component is preferably 15 parts by mass or more, more preferably 30 parts by mass or more for the reason that the effect by comprising the oil can be sufficiently obtained. Also, the content of the oil is, taking abrasion resistance into consideration, preferably 85 parts by mass or less, more preferably 75 parts by mass or less. It should be noted that as used herein the content of the oil includes an amount of oil being included in oil-extended rubber.

Examples of the diene-based liquid polymer include liquid styrene-butadiene copolymer (liquid SBR), liquid butadiene polymer (liquid BR), liquid isoprene polymer (liquid IR), liquid styrene-isoprene copolymer (liquid SIR) and the like. Among them, liquid SBR is preferable because abrasion resistance and steady steering stability while running can be improved in a good balance. It should be noted that the diene-based liquid polymer as used herein is a diene-based polymer which is in a liquid state at ordinary temperature (25° C.).

A weight-average molecular weight (Mw) of the diene-based liquid polymer in terms of polystyrene measured by gel permeation chromatography (GPC) is, taking abrasion resistance, breaking resistance, and durability into consideration, preferably $1.0 \times 10^3$ or more, more preferably $3.0 \times 10^3$ or more. Also, taking productivity into consideration, it is preferably $2.0 \times 10^5$ or less, more preferably $1.5 \times 10^4$ or less. It should be noted that the Mw of the liquid diene polymer as used herein is a value measured by gel permeation chromatography (GPC) and expressed in terms of polystyrene.

When the diene-based liquid polymer is contained, a content of the diene-based liquid polymer based on 100 parts by mass of the rubber component is, taking steering stability into consideration, preferably 10 parts by mass or more, more preferably 15 parts by mass or more. Also, the content of the diene-based liquid polymer is, taking abrasion resistance into consideration, preferably 80 parts by mass or less, more preferably 50 parts by mass or less.

A content of the softener based on 100 parts by mass of the rubber component is preferably 10 to 250 parts by mass, more preferably 15 to 200 parts by mass, further preferably 20 to 100 parts by mass. When the above content is within the above range, the effect of the invention can be suitably obtained. It should be noted that the content of the softener as used herein is the total amount of contents of the adhesive resin, the xylene-based low-temperature plasticizer, the oil, and the diene-based liquid polymer.

Also, a content of the adhesive resin in the softener is, taking steering stability on a low-temperature road surface into consideration, preferably 70% or less, more preferably 50% or less. Also, the content of the adhesive resin is preferably 5% or more, more preferably 10% or more of the softener for the reason that the effect by comprising the adhesive resin is sufficiently exerted.

The rubber composition according to the present embodiment, taking abrasion resistance into consideration, preferably comprises carbon black. Examples of the carbon black include carbon black produced by the oil furnace method or the like, and two kinds or more of carbon black having different colloidal characteristics can be used together. Specifically, the carbon black can be GPF, HAF, ISAF, SAF, or the like, and among those, SAF is suitable.

A nitrogen adsorption specific surface area ($N_2SA$) of the carbon black is, taking steering stability into consideration, preferably 100 $m^2/g$ or larger, more preferably 105 $m^2/g$ or larger, further preferably 110 $m^2/g$ or larger. Also, the nitrogen adsorption specific surface area of the carbon black is, taking dispersibility into consideration, preferably 600 $m^2/g$ or smaller, more preferably 250 $m^2/g$ or smaller, further preferably 180 $m^2/g$ or smaller. It should be noted that the nitrogen adsorption specific surface area of the carbon black is calculated according to JIS K 6217-2:2001.

An oil absorption number (OAN) of the carbon black is, taking abrasion resistance into consideration, preferably 50 ml/100 g or more, more preferably 100 ml/100 g or more. Also, the oil absorption number (OAN) of the carbon black is, taking grip performance into consideration, preferably 250 ml/100 g or less, more preferably 200 ml/100 g or less, further preferably 135 ml/100 g or less. It should be noted that the OAN of the carbon black is measured according to JIS K6217-4 2008.

When the carbon black is contained, a content of the carbon black based on 100 parts by mass of the rubber component is, taking abrasion resistance and steering stability into consideration, preferably 5 parts by mass or more, more preferably 10 parts by mass or more. Also, the content of the carbon black is, taking processability into consideration, preferably 200 parts by mass or less, more preferably 100 parts by mass or less.

As the reinforcing fillers, the carbon black can be used alone, or, in addition to the carbon black, those commonly used in rubber compositions for conventional tires, such as silica, calcium carbonate, alumina, clay, talc, and the like can also be used together. Among those, silica is preferable for the reinforcing filler being used with the carbon black because it improves performance on a wet road surface.

A nitrogen adsorption specific surface area ($N_2SA$) of the silica is, taking wet grip performance, elongation at break, and abrasion resistance into consideration, preferably 90 $m^2/g$ or larger, more preferably 100 $m^2/g$ or larger, further preferably 150 $m^2/g$ or larger. Also, the nitrogen adsorption specific surface area of the silica is, taking fuel efficiency, elongation at break and abrasion resistance into consideration, preferably 270 $m^2/g$ or smaller, more preferably 250 $m^2/g$ or smaller. It should be noted that the $N_2SA$ of the silica is measured by BET method according to ASTM D3037-81.

When the silica and the carbon black is used together, the total content of those is, taking abrasion resistance and processability into consideration, preferably 40 to 200 parts by mass.

It is preferably to use a silane coupling agent with the silica. Especially, an alkoxysilane coupling agent and a mercapto silane coupling agent are preferable. Examples of the alkoxysilane coupling agent include Si266, Si69 and the like. Examples of the mercapto silane coupling agent include Si363, NXT-Z45 and the like.

The zinc oxide is not specifically limited, and examples thereof include those used in the field of rubber such as tires. Here, fine particle zinc oxide can be suitably used among other kinds of zinc oxide. Specifically, the average primary particle size of the zinc oxide to be used is preferably 200 nm or smaller, more preferably 100 nm or smaller. The lower limit of the average primary particle size is not specifically limited but preferably 20 nm or larger, more preferably 30 nm or larger. It should be noted that the average primary particle size of the zinc oxide represents an average particle size (average primary particle size) converted from a specific surface area measured by BET method by nitrogen adsorption.

When the zinc oxide is blended, a content of the zinc oxide based on 100 parts by mass of the rubber component is preferably 0.5 to 10 parts by mass, more preferably 1 to 5 parts by mass. The effect of the present invention is more suitably obtained when the content of the zinc oxide is within the above range.

When sulfur is contained as a vulcanizing agent, a content of the sulfur based on 100 parts by mass of the rubber component is preferably 0.5 parts by mass or more from the viewpoint that sufficient vulcanization reaction is ensured and excellent grip performance and abrasion resistance are obtained. Also, the content of the sulfur is preferably 3 parts by mass or less because that inhibits deterioration of grip performance and abrasion resistance caused by blooming.

Examples of the vulcanization accelerators include sulfenamide vulcanization accelerators, thiasole vulcanization accelerators, thiuram vulcanization accelerators, and guanidine vulcanization accelerators, and among those thiasole vulcanization accelerators and thiuram vulcanization accelerators can be used suitably in the present embodiment.

Examples of the thiasole vulcanization accelerators include 2-mercaptobenzothiazole, cyclohexylamine salt of 2-mercaptobenzothiazole, di-2-benzothiazolyldisulfide and the like, and among those, di-2-benzothiazolyldisulfide is preferable. Examples of the thiuram vulcanization accelerators include tetramethylthiuram disulfide (TMTD), tetrabenzylthiuram disulfide (TBzTD), tetrakis(2-ethylhexyl)thiuram-disulfide (TOT-N) and the like, and among those, TOT-N is preferable.

When the vulcanization accelerators are blended, a content of the vulcanization accelerators based on 100 parts by mass of the rubber component is preferably 1 parts by mass or more, more preferably 3 parts by mass or more because sufficient vulcanization speed can be obtained and excellent steering stability and abrasion resistance can be obtained. Also, taking steering stability and abrasion resistance into consideration, the content of the vulcanization accelerators is preferably 15 parts by mass or less, more preferably 10 parts by mass or less.

The rubber composition according to the present embodiment is produced in a common method, such as one in which the above components are kneaded with a Banbury mixer, a kneader, an open roll and the like, and then the mixture is vulcanized.

The rubber composition according to the present embodiment is excellent in steering stability at low temperature and steering stability at high temperature after aging, while maintaining the initial steering stability at low temperature and initial steering stability at high temperature, and therefore is suitable for tread of tires, especially for tread of high-performance tires.

The tire of the present embodiment is produced using the above rubber composition in a common method. More specifically, the rubber composition comprising the above components is extruded into a shape of a tread before vulcanization and formed in a tire building machine with other tire members in a usual method to form an unvulcanized tire. This unvulcanized tire is then heated and pressed in a vulcanizer to obtain a tire. It should be noted that the high-performance tire mentioned in the present embodiment is a tire which is especially excellent in steering stability (especially steering stability performance on a dry road surface) and its concept includes competition tires used for competition vehicles, wherein the competition tires can be used suitably for competition tires for racing, especially dry competition tires used on a dry road surface.

Other preferred embodiments of the present invention include:

[1] A tire having a tread composed of a rubber composition comprising:

a softener comprising 5 to 50 parts by mass, preferably 10 to 40 parts by mass, more preferably 20 to 30 parts by mass of an adhesive resin and 5 to 50 parts by mass, preferably 10 to 40 parts by mass, more preferably 15 to 30 parts by mass of a xylene-based low-temperature plasticizer based on 100 parts by mass of a rubber component.

[2] The tire of the [1] above, wherein a content of the adhesive resin in the softener is not more than 70% by mass, preferably 5 to 70% by mass, more preferably 10 to 50% by mass.

[3] The tire of the [1] or [2] above, wherein a content ratio of the adhesive resin to the xylene-based low-temperature plasticizer (adhesive resin/xylene-based low-temperature plasticizer) is 0.5 to 5.0, preferably 1.0 to 4.0.

[4] The tire of any of [1] to [3] above, wherein a softening point of the adhesive resin is 50° C. to 170° C., preferably 60° C. to 160° C.

[5] The tire of any of [1] to [4], wherein the adhesive resin is a resin having a phenolic, coumarone-indene, terpene, acrylic, or styrene structure.

[6] The tire of any of [1] to [5] above, wherein a viscosity at 75° C. of the xylene-based low-temperature plasticizer is 5,000 mPa/s or lower, preferably 2,000 mPa/s or lower and a hydroxyl value thereof is 10 to 50 mg KOH/g, preferably 15 to 40 mg KOH/g.

EXAMPLE

The present invention will be described based on examples, but the invention is not to be understood exclusively based on those.

All of the chemicals used in the examples and comparative examples will be described.

SBR 1: TUFDENE 4850 (styrene content rate: 40% by mass, oil content based on 100 parts by mass of solid content of rubber: 50 parts by mass) manufactured by Asahi Kasei Chemicals Corporation SBR 2: NS616 (styrene content rate: 21% by mass) manufactured by ZEON CORPORATION BR: BR150B manufactured by Ube Industries, Ltd.

Carbon black: N134 ($N_2SA$: 148 $m^2/g$, OAN: 123 $m^1/100$ g) manufactured by CABOT Japan K. K.

Silica 1: ZEOSIL 1115GR ($N_2SA$: 115 $m^2/g$) manufactured by Rhodia Co., Ltd.

Silica 2: ZEOSIL 1165MP ($N_2SA$: 165 $m^2/g$) manufactured by Rhodia Co., Ltd.

Silane 1: alkoxysilane, Si266 (bis(3-triethoxysilylpropyl) disulfide) manufactured by Evonik Industries Silane 2: mercaptosilane, NXT-Z45 manufactured by Momentive Performance Materials Oil: Diana Process AH-24 manufactured by Idemitsu Kosan Co., Ltd. Diene-based liquid polymer: L-SBR-820 (liquid SBR, Mw: 10,000) manufactured by KURARAY CO., LTD.

Adhesive resin 1: Coumarone G-90 (coumarone-indene resin, softening point: 90° C.) manufactured by Nitto Chemical Co., Ltd.

Adhesive resin 2: SA 85 (styrene resin, softening point: 50 to 60° C.) manufactured by Arizona Chemical Corporation Adhesive resin 3: SYLVATRAXX4150 (terpene resin, softening point: 70 to 80° C.) manufactured by Arizona Chemical Corporation Adhesive resin 4: Nisseki Neopolymer 140S (aromatic petroleum resin, softening point: 140° C.) manufactured by JX Nippon Oil & Energy Corporation Adhesive resin 5: V120 (coumarone-indene resin, softening point: 120° C.) manufactured by Nitto Chemical Co., Ltd.

Low-temperature plasticizer 1: DOS (freezing point: −62° C., viscosity: 18 mPa·s (25° C.)) manufactured by DAIHACHI CHEMICAL INDUSTRY CO., LTD.

Low-temperature plasticizer 2: TOP (freezing point: −70° C. or lower, viscosity: 12 mPa·s (25° C.)) manufactured by DAIHACHI CHEMICAL INDUSTRY CO., LTD.

Xylene-based low-temperature plasticizer 1: Nikanol H (viscosity: 630 mPa·s (75° C.), acid value: 33 mg KOH/g) manufactured by Fudow Co., Ltd.

Xylene-based low-temperature plasticizer 2: Nikanol G (viscosity: 993 mPa·s (75° C.), acid value: 36 mg KOH/g) manufactured by Fudow Co., Ltd.

Wax: SUNNOC N manufactured by Ouchi Shinko Chemical Industrial Co., Ltd.

Anti-aging agent 1: Nocrack 6C manufactured by Ouchi Shinko Chemical Industrial Co., Ltd.

Anti-aging agent 2: Nocrack RD manufactured by Ouchi Shinko Chemical Industrial Co., Ltd.

Stearic acid: Stearic acid "Tsubaki" manufactured by NOF CORPORATION

Sulfur: sulfur powder manufactured by Tsurumi Chemical Industry Co., Ltd.

Vulcanization accelerator 1: Nocceler CS manufactured by Ouchi Shinko Chemical Industrial Co., Ltd.

Vulcanization accelerator 2: Nocceler TBzTD manufactured by Ouchi Shinko Chemical Industrial Co., Ltd.

Vulcanization accelerator 3: Nocceler DPG manufactured by Ouchi Shinko Chemical Industrial Co., Ltd.

Examples and Comparative Examples

According to the formulations shown in Tables 1 and 2, the compound materials other than the sulfur and vulcanization accelerators were kneaded with a 270 L Banbury mixer manufactured by Kobe Steel, Ltd. The sulfur and vulcanization accelerators were added to the kneaded product, the mixture was kneaded using an open roll to obtain an unvulcanized rubber composition. The obtained unvulcanized rubber composition was formed into the shape of a tread, laminated with other tire members in a tire building machine, and vulcanized for 30 minutes under a condition of 150° C. to obtain test tires (tire size: 215/45R17). With respect to the obtained test tires, the following evaluations were conducted. The results are shown in Tables 1 and 2.

Evaluation of Initial Steering Stability Performance

The test tires were mounted to a Japanese FR car of 2000 cc displacement, and actual car running was conducted on a test course with a dry asphalt road surface for 10 laps. Then, control stabilities at handling were evaluated by a test driver and the results were shown by index, assuming that the index of the comparative example 1 is 100. A larger index number indicates better steering stability performance. Results with index of 110 or larger are determined to be particularly satisfactory. This evaluation was conducted under two conditions with different road surface temperatures and the evaluation of a high-temperature road surface is assumed to be 100 (high-temperature road surface: 50° C., low-temperature road surface: 8° C.).

Evaluation of Steering Stability Performance after Aging

Evaluation was conducted after the test tires were deteriorated by placing them in an oven at 80° C. and 25% humidity for 168 hours in order to quickly create an aged state of the tires. The deteriorated test tires were mounted to a Japanese FR car of 2000 cc displacement, and actual car running was conducted on a test course with a dry asphalt road surface for 10 laps. Then, control stabilities at handling were evaluated by a test driver and the results were shown by index. A larger index number indicates better steering stability performance. Results with index numbers of 110 or larger are determined to be particularly satisfactory. This evaluation was conducted under two conditions with different road surface temperatures (high-temperature road surface: 50° C., low-temperature road surface: 8° C.).

TABLE 1

| | Comparative Examples | | | | Examples | | | | |
|---|---|---|---|---|---|---|---|---|---|
| | 1 | 2 | 3 | 4 | 1 | 2 | 3 | 4 | 5 |
| Compounding amount (part by mass) | | | | | | | | | |
| SBR 1 | 150 | 150 | 150 | 150 | 150 | 150 | 150 | 150 | 150 |
| SBR 2 | — | — | — | — | — | — | — | — | — |
| BR | — | — | — | — | — | — | — | — | — |
| Carbon black | 100 | 100 | 100 | 100 | 100 | 100 | 100 | 100 | 100 |
| Silica 1 | — | — | — | — | — | — | — | — | — |
| Silica 2 | — | — | — | — | — | — | — | — | — |
| Silane coupling agent 1 | — | — | — | — | — | — | — | — | — |
| Silane coupling agent 2 | — | — | — | — | — | — | — | — | — |
| Oil | 20 | 20 | 20 | 20 | 25 | 25 | 20 | 20 | 20 |
| Diene-based liquid polymer | 60 | 60 | 35 | 55 | 60 | 60 | 45 | 60 | 60 |
| Adhesive resin 1 | — | 25 | — | — | — | — | — | — | — |
| Adhesive resin 2 | — | — | 50 | — | — | — | 40 | — | 5 |
| Adhesive resin 3 | — | — | — | 10 | — | — | — | 10 | 5 |
| Adhesive resin 4 | — | — | — | 15 | — | — | — | 10 | — |
| Adhesive resin 5 | 25 | — | — | — | 20 | 20 | — | — | 10 |
| Low-temperature plasticizer 1 | 10 | 10 | 10 | — | — | — | — | — | — |
| Low-temperature plasticizer 2 | — | — | — | 15 | — | — | — | — | — |
| Xylene-based low-temperature plasticizer 1 | — | — | — | — | 10 | — | 10 | 15 | — |
| Xylene-based low-temperature plasticizer 2 | — | — | — | — | — | 10 | — | — | 15 |
| Zinc oxide | 2 | 2 | 2 | 2 | 2 | 2 | 2 | 2 | 2 |
| Wax | 1 | 1 | 1 | 1 | 1 | 1 | 1 | 1 | 1 |
| Anti-aging agent 1 | 1 | 1 | 1 | 1 | 1 | 1 | 1 | 1 | 1 |
| Anti-aging agent 2 | 3 | 3 | 3 | 3 | 3 | 3 | 3 | 3 | 3 |
| Stearic acid | 1 | 1 | 1 | 1 | 1 | 1 | 1 | 1 | 1 |
| Sulfur | 0.6 | 0.6 | 0.6 | 0.6 | 0.6 | 0.6 | 0.6 | 0.6 | 0.6 |
| Vulcanization accelerator 1 | 4 | 4 | 4 | 4 | 4 | 4 | 4 | 4 | 4 |
| Vulcanization accelerator 2 | 3 | 3 | 3 | 3 | 3 | 3 | 3 | 3 | 3 |
| Vulcanization accelerator 3 | — | — | — | — | — | — | — | — | — |
| Evaluation | | | | | | | | | |
| Initial steering stability at high temperature | 100 | 91 | 88 | 103 | 110 | 115 | 99 | 113 | 111 |
| Initial steering stability at low temperature | 100 | 106 | 116 | 98 | 106 | 102 | 121 | 106 | 111 |
| Steering stability at high temperature after aging | 89 | 81 | 77 | 95 | 106 | 112 | 95 | 109 | 106 |
| Steering stability at low temperature after aging | 62 | 68 | 79 | 59 | 89 | 86 | 104 | 90 | 97 |

TABLE 2

| | Comparative Examples | | | | | Examples | | | | |
|---|---|---|---|---|---|---|---|---|---|---|
| | 5 | 6 | 7 | 8 | 9 | 6 | 7 | 8 | 9 | 10 |
| Compounding amount (part by mass) | | | | | | | | | | |
| SBR 1 | 30 | 30 | 30 | 30 | 30 | 30 | 30 | 30 | 30 | 30 |
| SBR 2 | 50 | 50 | 50 | 50 | 50 | 50 | 50 | 50 | 50 | 50 |
| BR | 30 | 30 | 30 | 30 | 30 | 30 | 30 | 30 | 30 | 30 |
| Carbon black | 10 | 10 | 10 | 10 | 10 | 10 | 10 | 10 | 10 | 10 |

TABLE 2-continued

|  | Comparative Examples | | | | | Examples | | | | |
| --- | --- | --- | --- | --- | --- | --- | --- | --- | --- | --- |
|  | 5 | 6 | 7 | 8 | 9 | 6 | 7 | 8 | 9 | 10 |
| Silica 1 | 90 | — | — | — | — | 90 | 90 | — | — | — |
| Silica 2 | — | 90 | 90 | 90 | 90 | — | — | 90 | 90 | 90 |
| Silane coupling agent 1 | 9 | 9 | — | — | — | 9 | 9 | — | — | — |
| Silane coupling agent 2 | — | — | 9 | 9 | 9 | — | — | 9 | 9 | 9 |
| Oil | 20 | 20 | 20 | 20 | 18 | 25 | 25 | 23 | 25 | 22 |
| Diene-based liquid polymer | 15 | 15 | 15 | 15 | 15 | 10 | 10 | 10 | 10 | 5 |
| Adhesive resin 1 | — | — | — | — | — | — | — | — | — | — |
| Adhesive resin 2 | 8 | 8 | — | — | 7 | 8 | 8 | 7 | — | 5 |
| Adhesive resin 3 | — | — | 8 | 8 | 7 | — | — | 7 | 8 | 5 |
| Adhesive resin 4 | — | — | — | — | — | — | — | — | — | — |
| Adhesive resin 5 | 4 | 4 | 4 | 4 | — | 4 | 4 | — | 4 | 10 |
| Low-temperature plasticizer 1 | 5 | 5 | 5 | — | — | — | — | — | — | — |
| Low-temperature plasticizer 2 | — | — | — | 5 | 5 | — | — | — | — | — |
| Xylene-based low-temperature plasticizer 1 | 10 | — | 10 | 15 | — | — | 5 | 5 | 5 | 5 |
| Xylene-based low-temperature plasticizer 2 | — | 10 | — | — | 15 | 5 | — | — | — | — |
| Zinc oxide | 2 | 2 | 2 | 2 | 2 | 2 | 2 | 2 | 2 | 2 |
| Wax | 1 | 1 | 1 | 1 | 1 | 1 | 1 | 1 | 1 | 1 |
| Anti-aging agent 1 | 1 | 1 | 1 | 1 | 1 | 1 | 1 | 1 | 1 | 1 |
| Anti-aging agent 2 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Sulfur | 0.6 | 0.6 | 0.6 | 0.6 | 0.6 | 0.6 | 0.6 | 0.6 | 0.6 | 0.6 |
| Vulcanization accelerator 1 | 4 | 4 | 4 | 4 | 4 | 4 | 4 | 4 | 4 | 4 |
| Vulcanization accelerator 2 | — | — | 3 | 3 | 1.5 | — | — | 1.5 | 1.5 | 1.5 |
| Vulcanization accelerator 3 | 3 | 3 | — | — | 1.5 | 3 | 3 | 1.5 | 1.5 | 1.5 |
| Evaluation | | | | | | | | | | |
| Initial steering stability at high temperature | 78 | 88 | 80 | 78 | 76 | 89 | 86 | 91 | 101 | 109 |
| Initial steering stability at low temperature | 131 | 135 | 141 | 146 | 155 | 141 | 144 | 158 | 145 | 130 |
| Steering stability at high temperature after aging | 71 | 80 | 75 | 71 | 69 | 85 | 81 | 86 | 95 | 114 |
| Steering stability at low temperature after aging | 102 | 105 | 113 | 120 | 131 | 125 | 129 | 142 | 127 | 114 |

The results of Tables 1 and 2 show that the tires of the present embodiment having a tread composed of the rubber composition comprising a specified amount of the adhesive resin and the xylene-based low-temperature plasticizer are excellent in steering stabilities at low temperature and at high temperature after aging without deterioration of the initial steering stabilities at low temperature and at high temperature.

What is claimed is:

1. A tire having a tread composed of a rubber composition comprising:
    a rubber component comprising 10% by mass or more of styrene-butadiene rubber based on 100% by mass of the rubber component,
    a softener consisting essentially of
        5 to 50 parts by mass of an aromatic petroleum resin,
        5 to 50 parts by mass of a xylene-based plasticizer having a viscosity of 5,000 mPa·s or lower at 75° C.,
        15 to 85 parts by mass of a process oil, and
        5 to 80 parts by mass of a diene-based liquid polymer, and
    a reinforcing filler selected from the group consisting of silica, carbon black, and combinations thereof,
    wherein
    when carbon black is present, the carbon black has a content of 5 to 200 parts by mass and an oil absorption number of 50 ml/100 g or more and 250 ml/100 g or less, and
    the parts by mass are based on 100 parts by mass of the rubber component, the aromatic petroleum resin to xylene-based plasticizer content ratio (aromatic petroleum resin/xylene-based plasticizer) is 0.5 to 5.0, and the aromatic petroleum resin has a softening point of 50° C. to 170° C.

2. The tire of claim 1, wherein a content of the aromatic petroleum resin in the softener is not more than 70% by mass.

3. The tire of claim 1, wherein the aromatic petroleum resin is a resin having a phenolic, coumarone-indene, terpene, acrylic, or styrene structure.

4. The tire of claim 1, wherein the xylene-based plasticizer has a hydroxyl value of 10 to 50 mg KOH/g.

5. The tire of claim 2, wherein the aromatic petroleum resin is a resin having a phenolic, coumarone-indene, terpene, acrylic, or styrene structure.

6. The tire of claim 2, wherein the xylene-based plasticizer has a hydroxyl value of 10 to 50 mg KOH/g.

7. The tire of claim 3, wherein the xylene-based plasticizer has a hydroxyl value of 10 to 50 mg KOH/g.

8. The tire of claim 5, wherein the xylene-based plasticizer has a hydroxyl value of 10 to 50 mg KOH/g.

9. The tire of claim 1, wherein a styrene content of the styrene-butadiene rubber is 20 to 60% by mass.

10. The tire of claim 1, wherein a content of the aromatic petroleum resin in the softener is 5 to 70%.

11. The tire of claim 1, wherein the diene-based liquid polymer is a liquid styrene-butadiene copolymer.

12. The tire of claim 1, wherein the rubber composition further comprises 1 to 15 parts by mass of a vulcanization accelerator, based on 100 parts by mass of the rubber component,
    wherein the vulcanization accelerator comprises a thiazole vulcanization accelerator and a thiuram vulcanization accelerator.

13. The tire of claim 1, wherein the aromatic petroleum resin comprises a petroleum resin having a softening point of 60° C. or higher and 110° C. or lower, and a petroleum resin having a softening point of higher than 110° C. and 170° C. or lower.

14. The tire of claim 1, wherein the content of process oil is 32 to 85 parts by mass, based on 100 parts by mass of the rubber component.

* * * * *